UNITED STATES PATENT OFFICE.

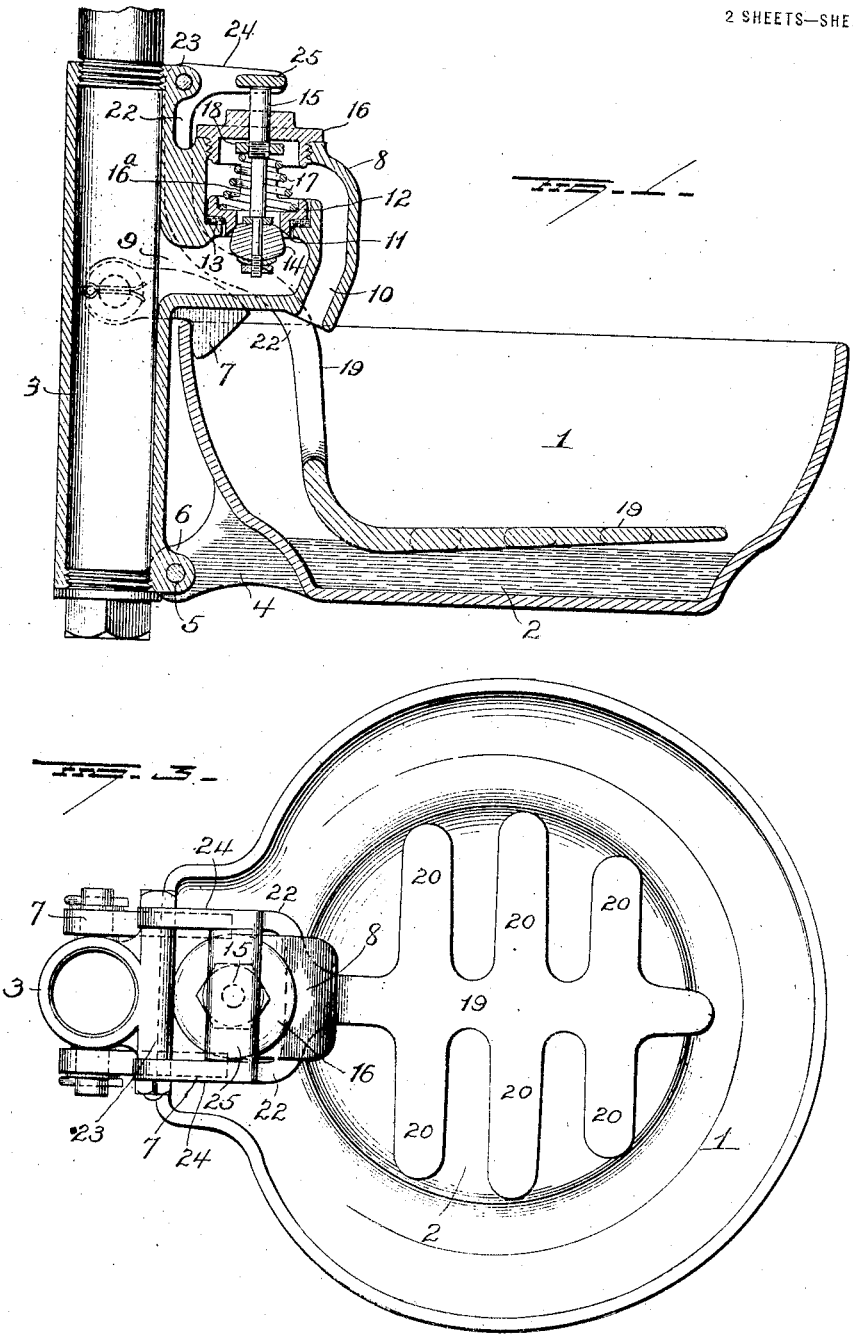

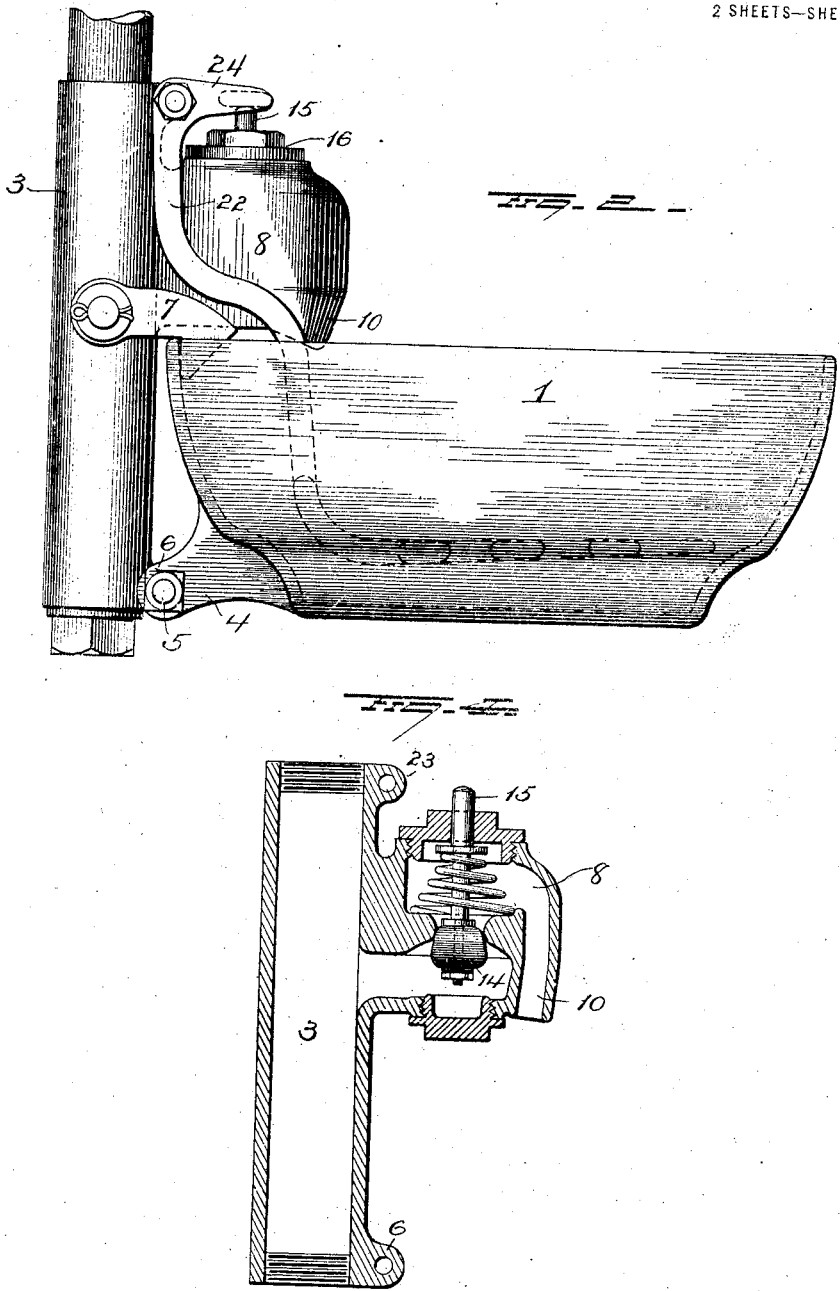

HUGO C. RASSMANN, OF BEAVER DAM, WISCONSIN.

WATERING DEVICE FOR CATTLE.

1,204,066.  Specification of Letters Patent.  Patented Nov. 7, 1916.

Application filed May 8, 1916. Serial No. 96,207.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Cattle; and I do hereby declare the following to be a full, clear, and exact description of the invention, such as will enable others skilled in the art to which it appertains to make and use the same.

This invention relates to improvements in watering devices for cattle,—one object of the invention being to so construct the device that a small amount of water shall be caused to remain in the bowl at all times to serve as a bait for the animal and to provide simple and efficient means operable by the animal to cause the flow of water into the bowl, whereby fresh drinking water for the animal shall be insured.

A further object is to so construct and arrange the device that the cleaning of the bowl shall be facilitated.

With these and other objects in view, the invention consists in certain novel features of construction and combinations of parts as hereinafter set forth and pointed out in the claims.

In the accompanying drawings; Figure 1 is a sectional view of a drinking device showing an embodiment of my invention; Fig. 2 is a side elevation of the same; Fig. 3 is a plan view, and Fig. 4 is a view showing a modification of the valve structure.

1 represents a drinking bowl for cattle having a recessed bottom portion 2, this recessed or depressed portion being intended to receive a small quantity of water and retain such small quantity in the bowl at all times to constitute a bait for the animals. The bowl is pivotally connected with a standard or stand-pipe 2,—for which purpose the bottom portion of the bowl may be made with one or more lugs 4 to accommodate a hinge pin 5, which latter also passes through a suitable boss 6 on the stand-pipe. Latches 7 are pivotally attached to the stand-pipe 3 and these latches engage over the upper edge of the bowl so as to retain the latter in its normal horizontal position. With the bowl thus mounted, it can be readily lowered to facilitate cleaning the same.

A casing 8 is provided on the stand-pipe and may be cast integral therewith as shown in Fig. 1. This casing is formed with a duct 9 communicating with the stand-pipe 3, and said casing is also made with a discharge duct or spout 10, the lower portion of which is somewhat inclined rearwardly so as to discharge water rearwardly into the rear portion of the bowl 1 in a manner not to interfere with an animal which may be in the act of drinking.

Between the ducts 9 and 10, an annular, horizontally disposed shoulder 11 is formed within the casing 8 for the accommodation of a member forming a valve seat 12, and between said valve seat and shoulder, a gasket 13 is located. A valve 14 seats upwardly against the valve seat and the stem 15 of this valve extends upwardly and passes freely through a hole in a cap 16 screwed into the top of the casing 8, and connected with the valve seat member as indicated at 16ª. A spring 17, encircling the stem 15 bears at its lower end against the valve seat 12 and at its upper end against a collar 18 on the stem 15, said spring thus normally operating to retain the valve against its seat and prevent the flow of water to the bowl. The valve mechanism is thus made in a self-contained structure, but if desired, the valve seat member and its connection with the cap 16 may be omitted and the valve seat formed as an integral part of the valve casing, as shown in Fig. 4.

The valve 14 is operable by the animal to permit flow of water to the bowl, and this is accomplished by means of a lever 19. The body portion of this lever may be of a size approximating that of the recessed bottom portion of the bowl and is so mounted as to normally lie over said recessed bottom portion. The body portion of the lever may be made of open work,—viz. it may comprise a plurality of spaced arms 20 as shown in Fig. 1. At the rear end of its body portion, the lever 19 extends upwardly as indicated at 21, Fig. 1 and is then bifurcated to form two upwardly-projecting members 22 pivotally connected at their upper ends to a boss 23 on the standpipe 3. Arms 24 project forwardly from the pivoted support of the lever members 22, and these arms are connected by a cross bar 25 disposed immediately over and adapted to engage the upper end of the valve stem 15.

With my improvements as above described, a vertically disposed valve is provided and the lever is so constructed and mounted that adequate power can be imparted to the valve to promptly open the same against the resistance of the spring 17, when the body portion of said lever is depressed by the animal. The location of the body portion over and near to the bottom of the bowl is of importance because it permits only a small amount to remain in the bowl to serve as a bait, and thus the supply of fresh water as soon as the animal depresses the lever in an effort to reach the water in the bottom of the bowl, will be insured.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a watering device for animals, the combination of a stand pipe, a bowl hinged near its bottom thereto, a latch mounted on the stand pipe and engaging the upper portion of the bowl, and animal-controlled means for discharging water from said standpipe to the bowl.

2. In an animal watering device, the combination of a water pipe, a bowl supported thereby, a valve casing rigid with said water pipe and projecting over the bowl, said casing having a lateral duct communicating with the water pipe and a duct discharging into the bowl, said last-mentioned duct being deflected in a direction toward the rear end of the bowl, a spring-actuated valve disposed between said ducts, and an animal-operated lever operatively associated with said valve.

3. In an animal watering device, the combination with a water pipe, a bowl, a casing rigid with the water pipe and having two ducts, one of said ducts communicating with the water pipe and the other discharging into the bowl, a spring actuated valve between said ducts and provided with a stem projecting above the casing, of an animal-operated lever having a member disposed over the bottom of the bowl, said lever having an upwardly projecting part at one end, said upwardly projecting part being bifurcated forming two arms pivotally mounted near their upper ends on said pipe, said arms terminating in forwardly projecting members, and a cross bar connecting said forwardly projecting lever members and disposed over the stem of the valve.

In testimony whereof, I have signed this specification in the presence of two subscribing witnesses.

HUGO C. RASSMANN.

Witnesses:
J. McCLURE,
C. N. HARVEY.